Dec. 24, 1935.    J. B. McWILLIAMS ET AL    2,025,543
APPARATUS FOR CLEANING BALLAST
Filed Nov. 8, 1932    9 Sheets-Sheet 1

INVENTORS
James B. McWilliams &
Lawrence A. Merk
by their attorneys

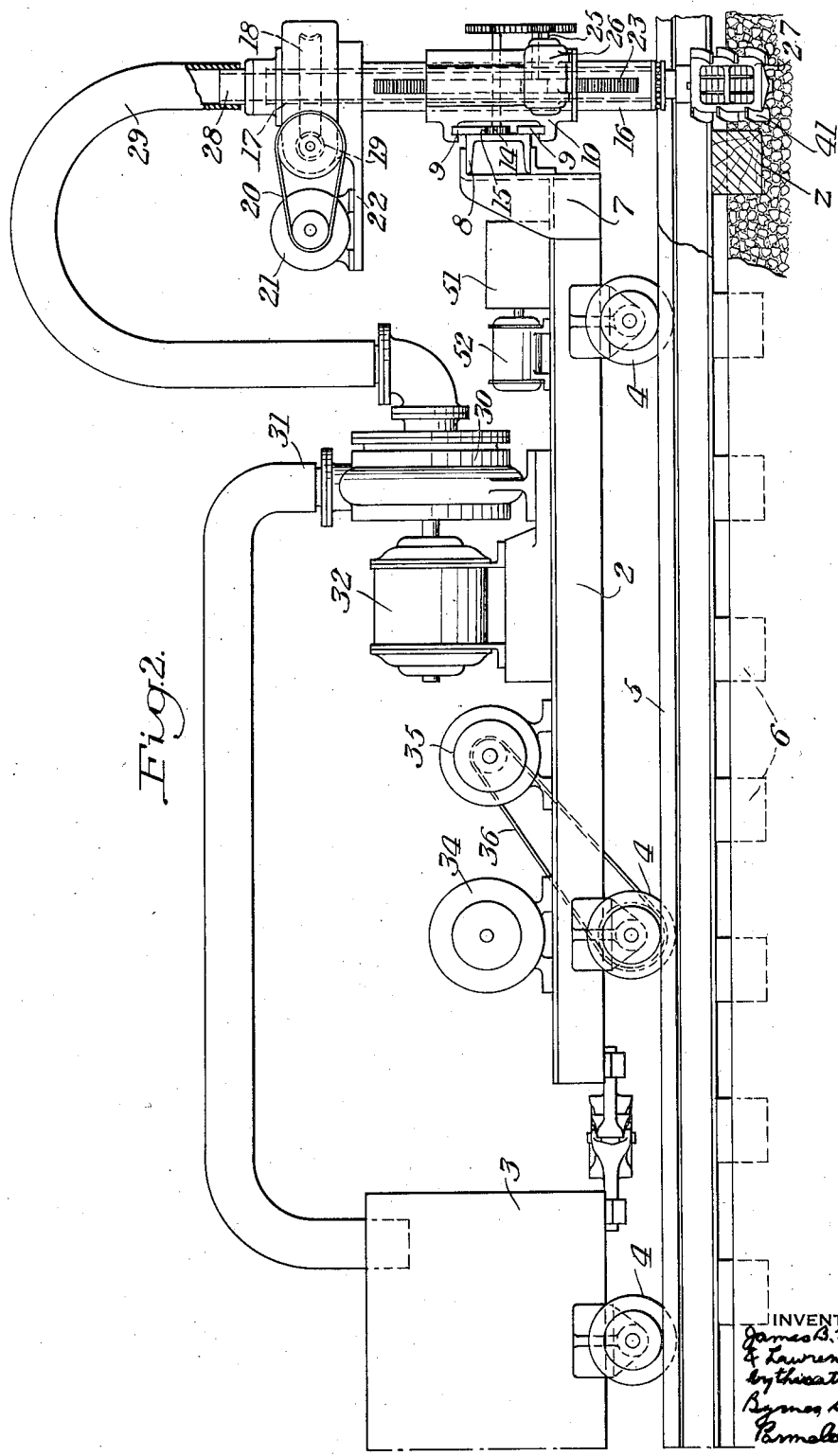

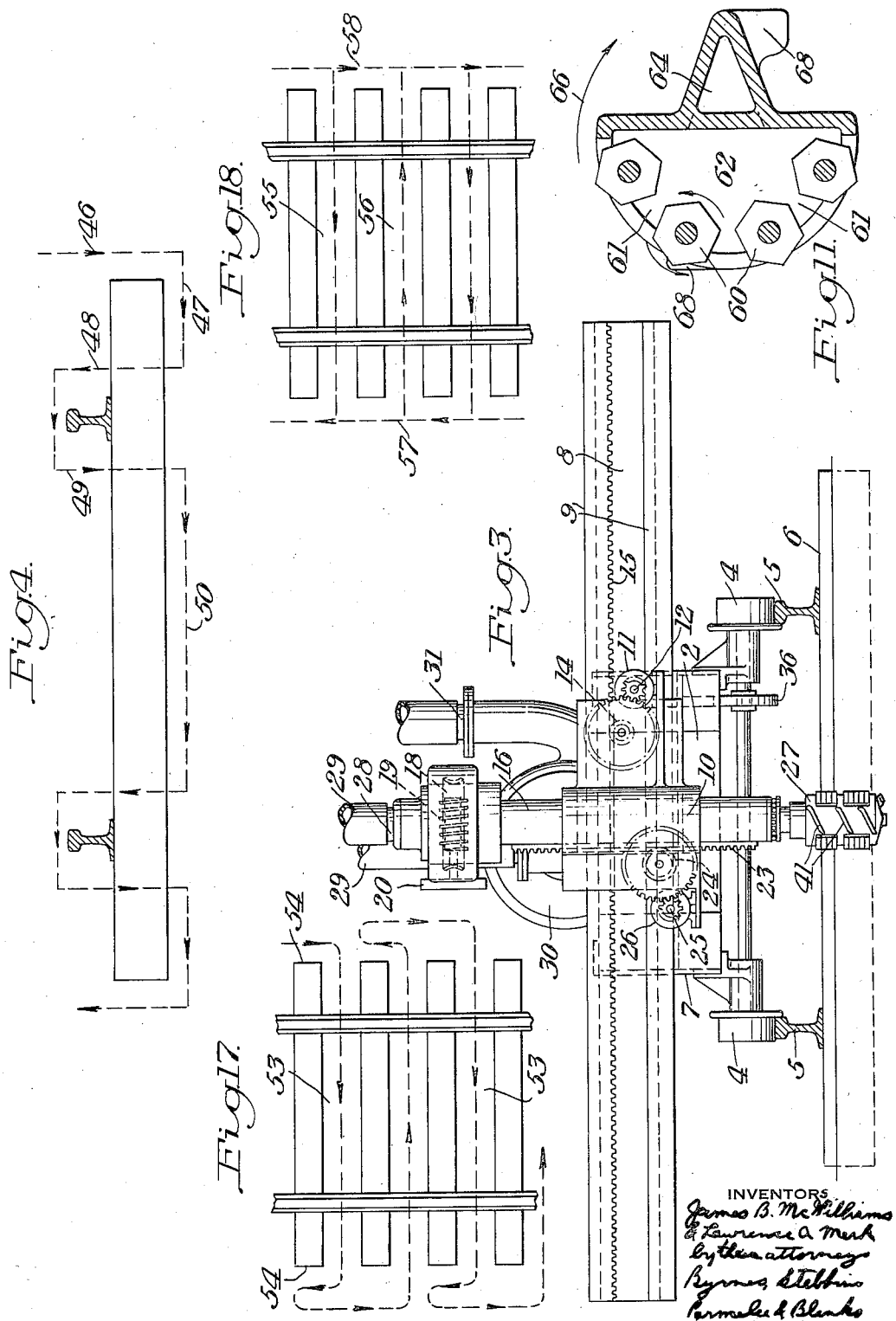

Dec. 24, 1935.  J. B. McWILLIAMS ET AL  2,025,543
APPARATUS FOR CLEANING BALLAST
Filed Nov. 8, 1932    9 Sheets-Sheet 4

INVENTORS
James B. McWilliams
Lawrence A. Merk
By their attorneys
Byrnes, Stebbins, Parmelee & Blenko Dec. 24, 1935. J. B. McWILLIAMS ET AL 2,025,543
APPARATUS FOR CLEANING BALLAST
Filed Nov. 8, 1932 9 Sheets-Sheet 6

INVENTORS
James B. McWilliams &
Lawrence A. Merk
by their attorneys
Byrnes, Stebbins, Parmelee & Blenko Dec. 24, 1935.  J. B. McWILLIAMS ET AL  2,025,543
APPARATUS FOR CLEANING BALLAST
Filed Nov. 8, 1932    9 Sheets-Sheet 7
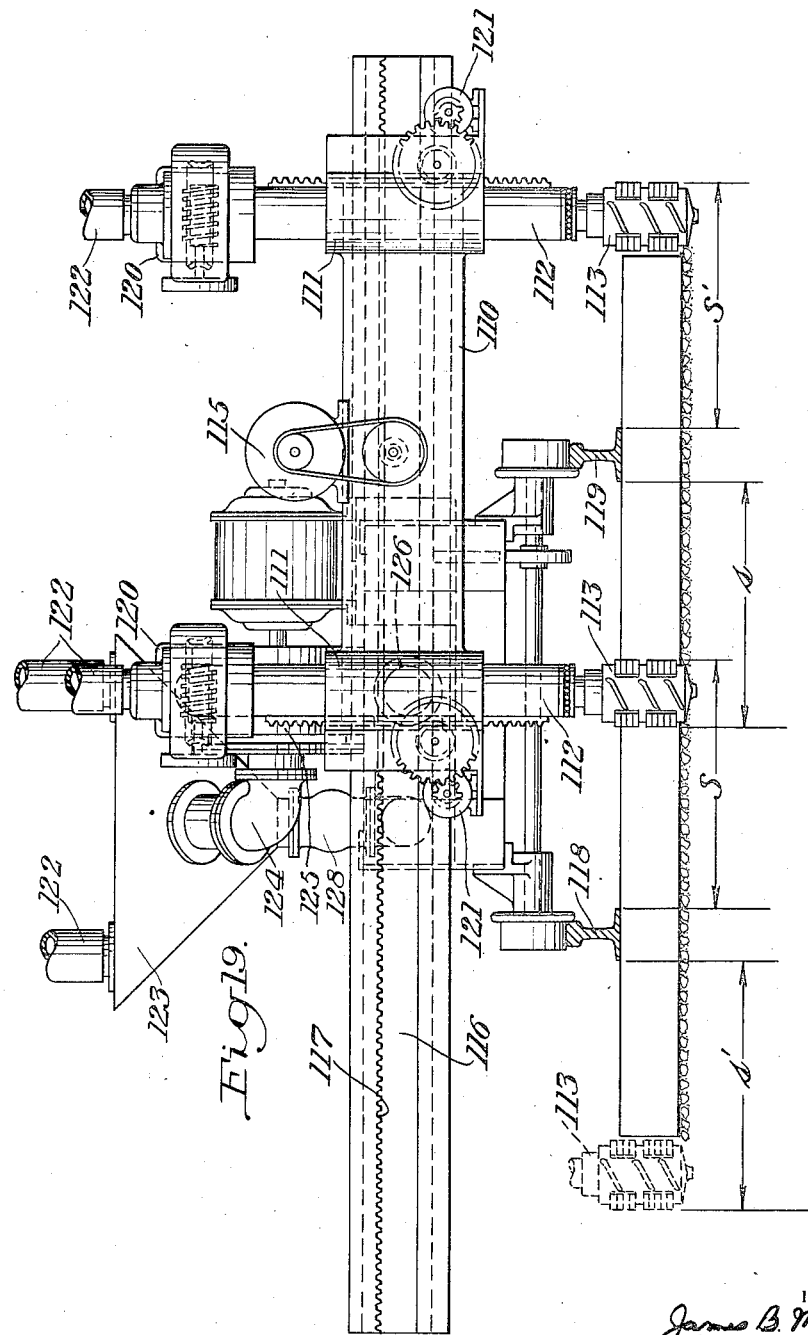

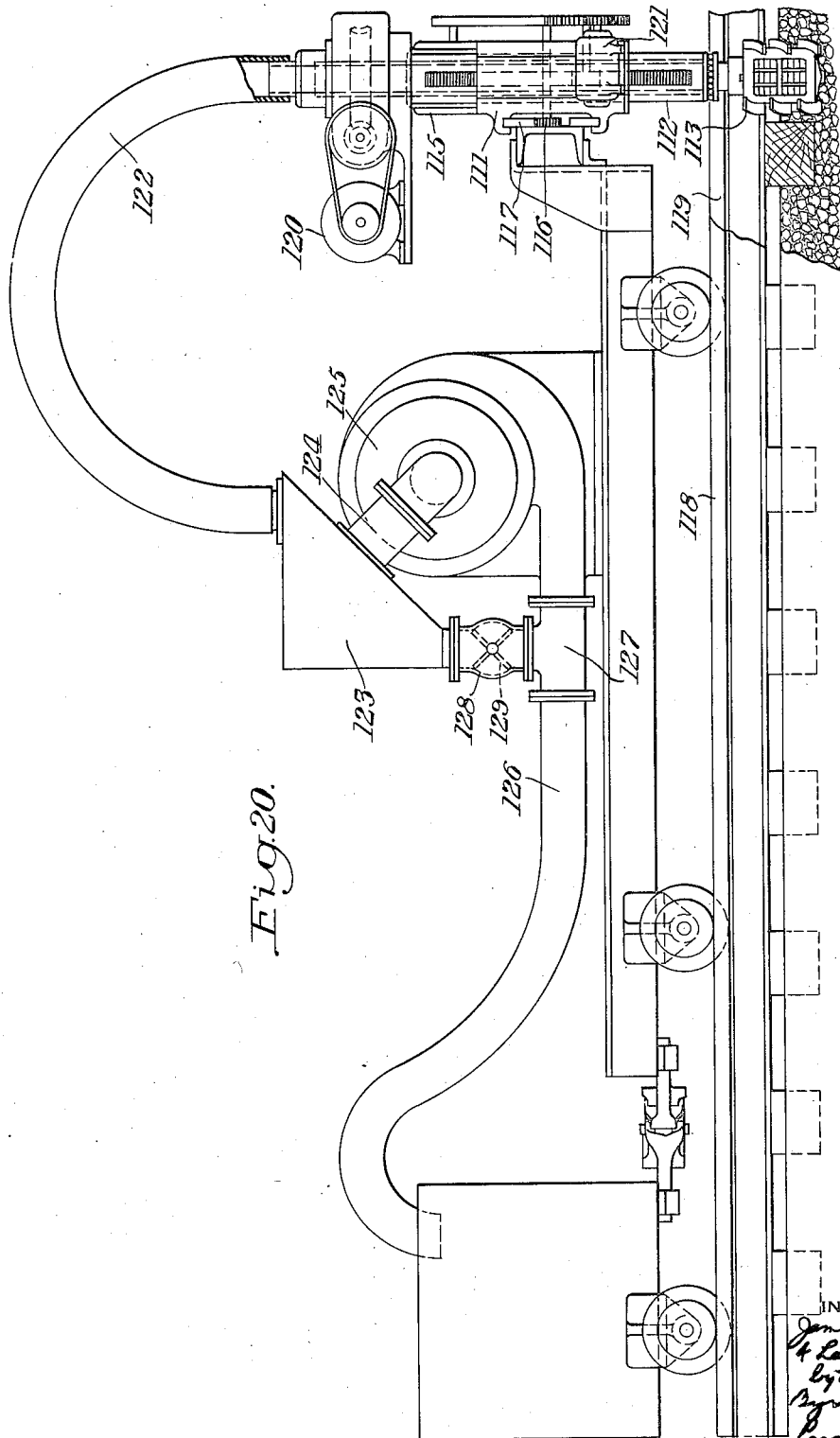

Dec. 24, 1935.  J. B. McWILLIAMS ET AL  2,025,543
APPARATUS FOR CLEANING BALLAST
Filed Nov. 8, 1932  9 Sheets-Sheet 9
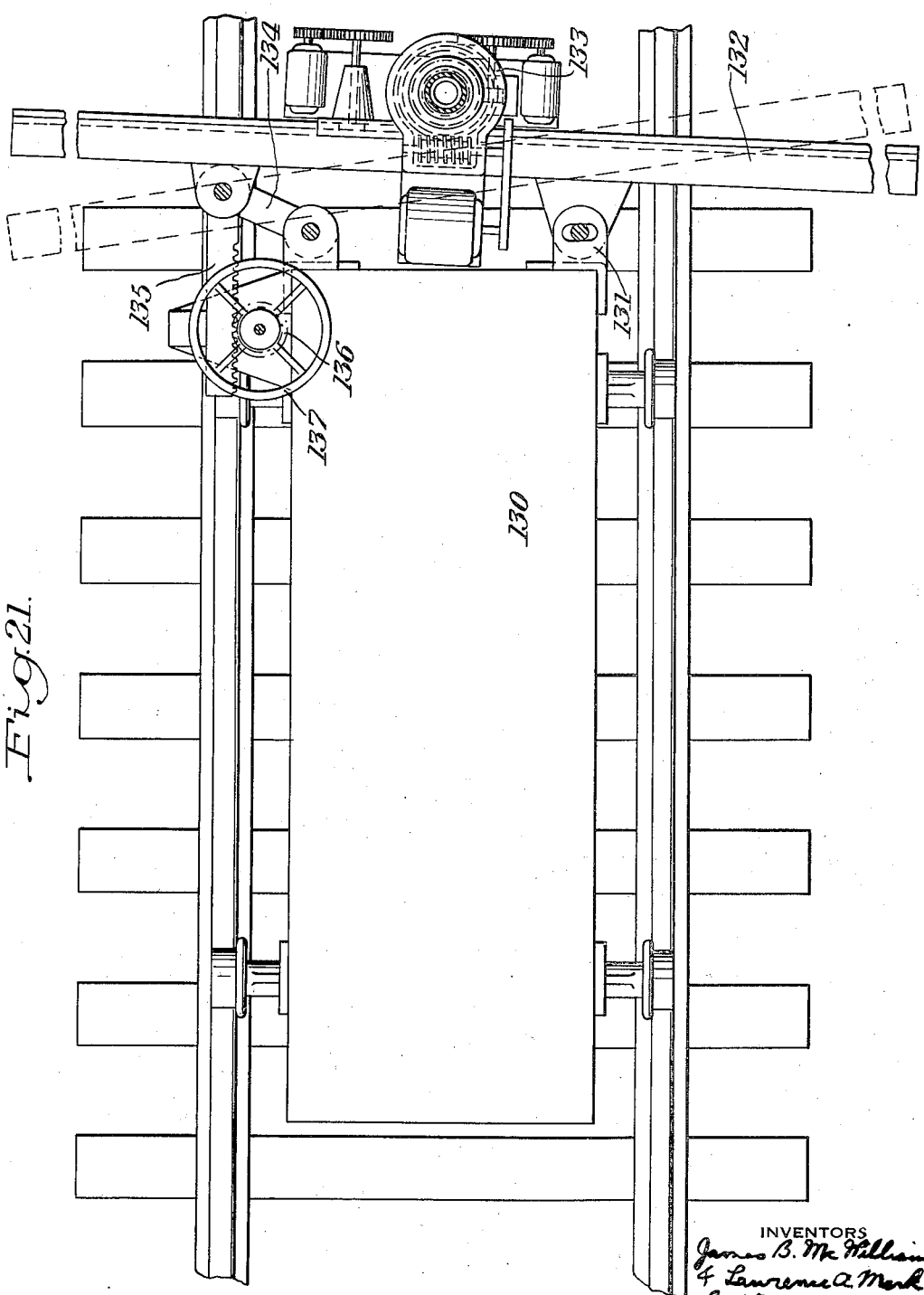
INVENTORS
James B. McWilliams
& Lawrence A. Merk
by their attorneys
Byrnes, Stebbins, Parmelee & Blenko Patented Dec. 24, 1935

2,025,543

UNITED STATES PATENT OFFICE 2,025,543

APPARATUS FOR CLEANING BALLAST

James B. McWilliams and Lawrence A. Merk, Pittsburgh, Pa., assignors to Railway Maintenance Corporation, Pittsburgh, Pa., a corporation of Pennsylvania Application November 8, 1932, Serial No. 641,733

15 Claims. (Cl. 262—2)

The present invention relates broadly to the art of material handling and treating, and more particularly to a method and apparatus directed to the cleaning of ballast in the crib or space between the ties of railroad tracks.

One of the important items of upkeep with respect to a main line track is that of maintaining the ballast in proper condition. Effective means and methods have been developed heretofore for the cleaning of the ballast lying outside of the roadbed proper, i. e., inside of the space lying between the ends of the ties. Up to the present time, however, no satisfactory method or apparatus has been developed for the cleaning of the ballast in the cribs or spaces between the ties.

It is well recognized by those skilled in the art that proper preservation of the ties is dependent upon prompt drainage of water from the spaces between the ties. If any appreciable amount of fines accumulates in such spaces, effective drainage is prevented and not only are the ties subjected to moisture to such an extent as to result in rapid deterioration thereof, but the roadbed is softened and its efficiency correspondingly impaired. In an effort to overcome this difficulty, it is customary at the present time to remove all of the ballast, dirt and fine materials from the cribs by hand, separate the fines from the ballast and return the ballast to the cribs, the fines being suitably disposed of. This is an extremely slow, laborious and expensive operation, as will be readily apparent.

In accordance with the present invention, it is proposed to remove the dirt and fine materials only from the cribs or inter-tie spaces to a desired depth without bodily removing the ballast, thus leaving the ballast in such condition that free drainage is permitted. Such a method and apparatus also provides proper tamping material between the ties so that after a cleaning operation it is possible, if desired, to utilize usual tamping methods for placing additional ballast below the ties.

Another object of the present invention is to provide means for cleaning such cribs or inter-tie spaces without disturbing the portion of the roadbed immediately below the ties themselves.

In the accompanying drawings we have shown for purposes of illustration only, and more or less diagrammatically, certain preferred embodiments of the present invention whereby the foregoing and other objects may be effectively obtained.

In the drawings:—

Figure 2 is a side elevation of the structure illustrated in Figure 1;

Figure 3 is an end elevation of the cleaning unit;

Figure 4 is a diagrammatic view illustrating the path of travel of the cleaning head;

Figure 7 is a transverse sectional view of the head of Figures 5 and 6;

Figure 9 is a top plan view of the head illustrated in Figure 8;

Figure 16 is a side elevational view of a modified embodiment of our invention;

Figure 17 is a diagrammatic top plan view indicating one path of travel that may be followed by the cleaning head for cleaning the crib or inter-tie spaces and also the ballast adjoining the ends of the ties;

Figure 18 is a view similar to Figure 17 illustrating a modified cleaning method;

Figure 19 is an end elevational view, similar to Figure 3, of a modified embodiment of the invention;

Figure 20 is a side elevational view of the apparatus illustrated in Figure 19; and Figure 21 is a detail view, partly in section, of a modified embodiment of the invention.

In order to provide an effective ballast cleaner, it is essential that the entire structure be self-contained and self-propelled, so that it may be operated over the right of way at distances remote from a source of power. This is true even in cleaning electrified systems, since with present installations the current is supplied for operating purposes under such a voltage that it cannot be effectively utilized for auxiliary equipment such as required, for example, for roadbed appliances. It is further necessary that the equipment be as compact as possible so as not to unduly interfere with traffic on adjacent tracks. To this end the equipment, as illustrated generally in Figures 1 and 2 may be of the type adapted to travel along a given trackway and clean the ballast from the cribs of that trackway, or may be constructed as illustrated diagrammatically in Figure 16, for travelling in the space between adjacent tracks and clean the crib ballast of a track lying on one side thereof.

It is further desirable that the fines removed during the cleaning operation be collected not only for the purpose of precluding the possibility of their being picked up by passing trains and again deposited on the roadway, but for the purpose of preventing undue dust clouds during a cleaning operation and consequent interference with the vision of engineers and other railroad operatives.

Figure 1:
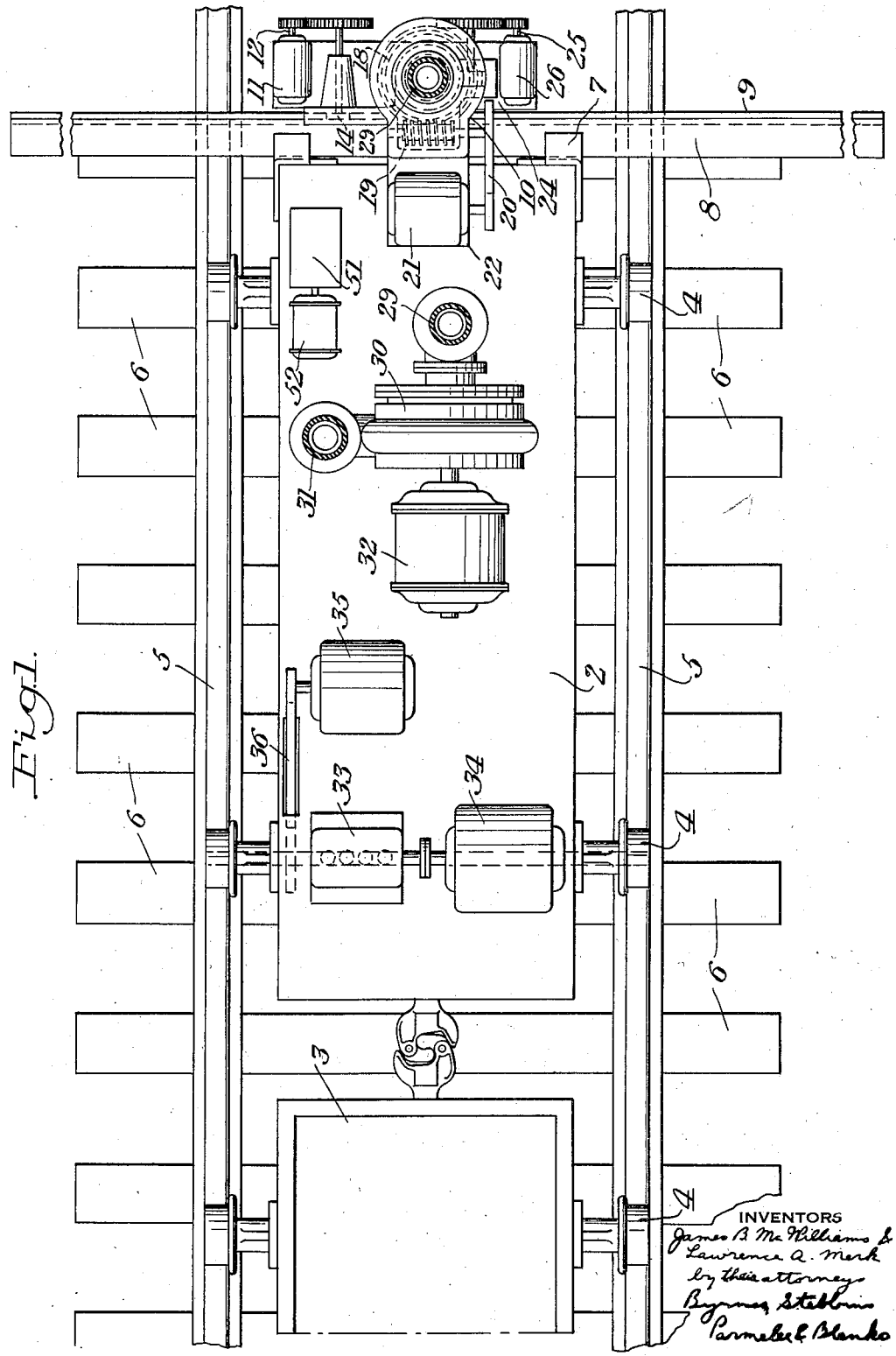
Figure 1 is a top plan view of a self-contained, self-propelled cleaning unit constructed in accordance with the present invention.

In the form of our invention illustrated in Figures 1 and 2, there is provided a truck 2 of suitable construction adapted to carry the cleaning equipment per se, and a trailer 3 of any desired construction adapted to receive and transport the fines removed as the result of a cleaning operation. Both the truck 2 and the truck 3 in this connection may be provided with suitable track wheels 4 for cooperation with the usual rails 5 carried by ties 6.

The truck 2 is shown as provided adjacent one end thereof with suitable brackets 7 to which is secured a cross beam 8 providing tracks or guide flanges 9 for a cleaning unit 10.

The cleaning unit 10 is herein illustrated as comprising a carriage adapted to be propelled along the cross beam 8 by means of a motor 11 the armature shaft 12 of which, through suitable gearing, drives a pinion 14 meshing with the teeth of a rack 15 secured to the cross beam in such manner that rotation of the motor 11 will be effective for traversing the carriage 10 from one end of the cross beam to the other.

Extending vertically in a suitable bearing in the carriage 10 is a shaft housing 16 of hollow construction having suitably supported therein and extending lengthwise thereof a hollow shaft 17. The shaft 17 adjacent its upper end has secured thereto a worm wheel 18 with which meshes a worm 19 adapted to be driven through a flexible connection 20, such as a belt, from a head rotating motor 21. This motor and its associated parts are conveniently supported on a motor bracket 22 projecting outwardly from the housing 16.

Extending vertically of the housing along one side thereof is a rack 23 with which is adapted to mesh a pinion 24 geared to a pinion on the armature shaft 25 of a head raising and lowering motor 26 by means of which the shaft housing 16 and its associated parts may be bodily raised or lowered.

Secured to the lower end of the shaft 16 is a cleaning head 27 which may be of any of the types hereinafter described in detail, and of such diameter as to fit in the crib space of ties having any usual spacing, and travel therebetween for effecting the desired ballast cleaning operation.

The upper end of the hollow shaft 17 communicates with a sleeve 28 to which is connected a suction hose 29 leading to the intake of a fan blower 30. This fan blower may be of any desired type adapted for producing the necessary suction for elevating the fines, and is provided with an outlet connection 31 leading backwardly over the truck 2 and into the container on the trailer 3 for depositing fines in the enclosed space provided by the trailer. The fan blower 30 is adapted to be operated by a blower motor 32 carried by the truck 2.

Also mounted on the truck 2 at any convenient point, is a gasoline motor 33 operatively connected to a generator 34 providing the necessary current for operating the blower motor 32, the head rotating motor 21, the traversing motor 11 or the head adjusting motor 26. Where it is desired to propel the structure by power means, the truck 2 may also carry a propelling motor 35 having an operative driving connection 36 to one or more of the track wheels, the propelling motor also being supplied by the generator 34.

Figure 5:
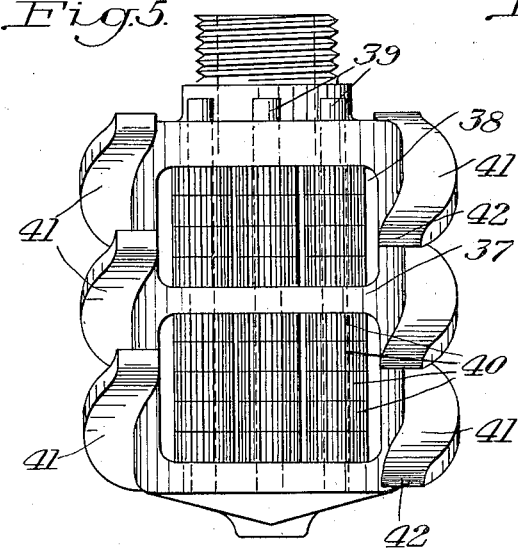
Figure 5 is a side elevational view of a preferred form of cleaning head.
Figure 6:
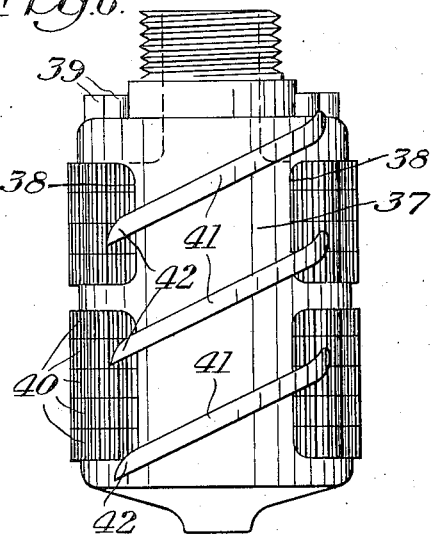
Figure 6 is a view similar to Figure 5, illustrating the cleaning head from the right hand side thereof as viewed in Figure 5.
Figure 8:
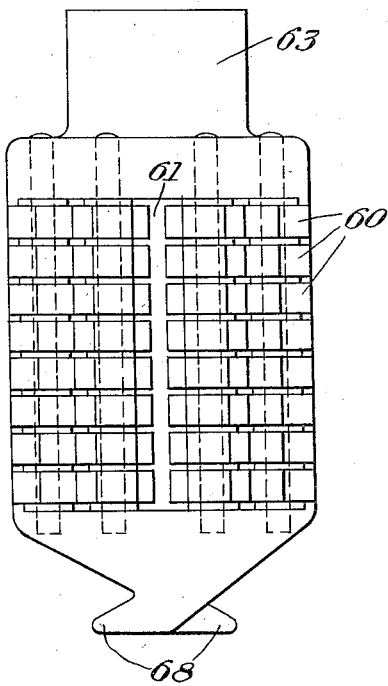
Figure 8 is a view similar to Figure 5 illustrating a modified form of cleaning head.
Figure 10:
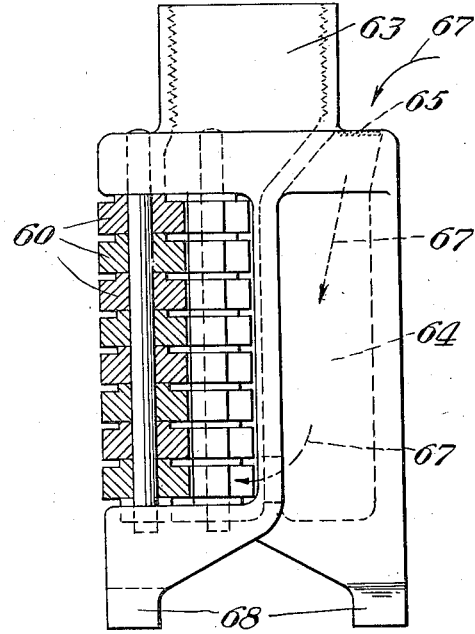
Figure 10 is a view partly in side elevation and partly in section of the head of Figures 8 and 9.
Figure 11:
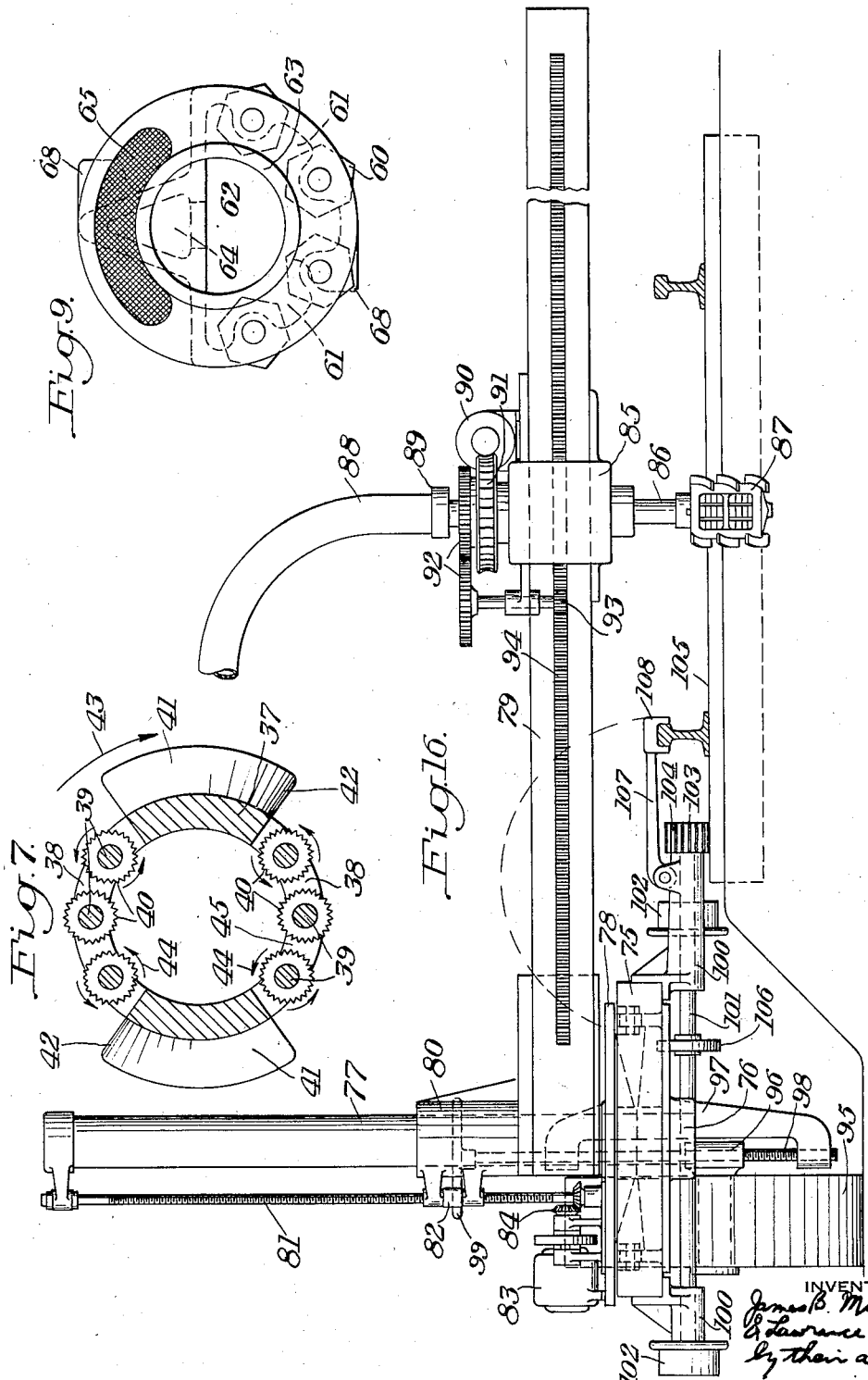
Figure 11 is a transverse sectional view through the cleaning head of Figures 8, 9 and 10.
Figure 12:
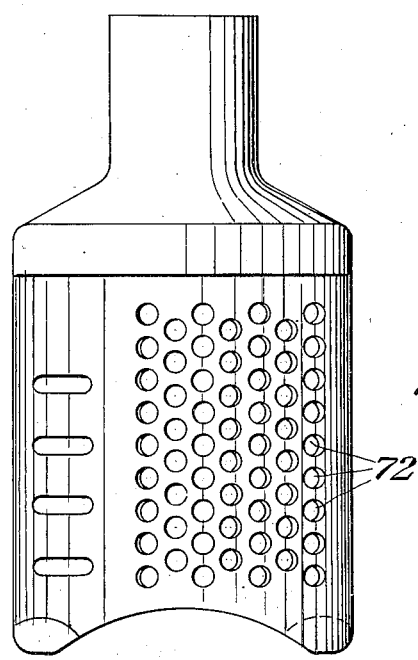
Figure 12 is a side elevational view of still another form of cleaning head.
Figure 13:
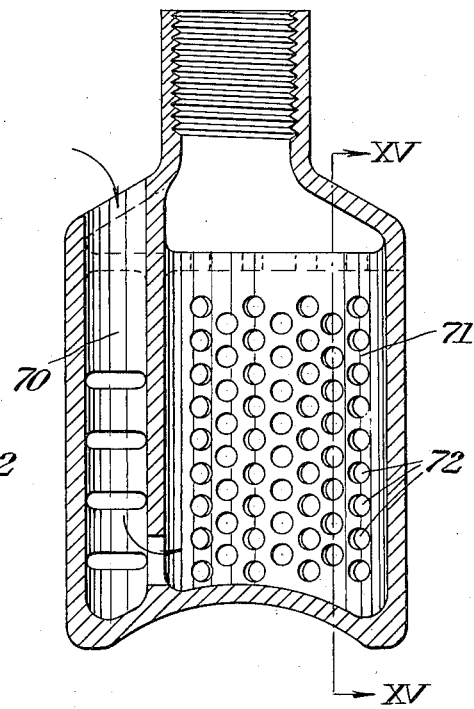
Fig. 13 is a vertical sectional view through the cleaning head of Figure 12.
Figure 15:
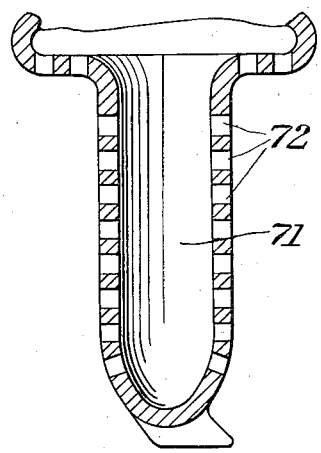
Figure 15 is a vertical sectional view along the line XV—XV of Figure 13, looking in the direction of the arrows.
Figure 14:
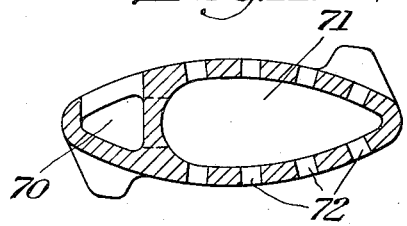
Figure 14 is a transverse sectional view through the head of Figures 12 and 13.

In Figures 5, 6 and 7, we have illustrated one form of cleaning head which has been found particularly desirable for inter-tie ballast cleaning in accordance with the present invention. This head comprises a hollow casing 37 in the form of a suitable casting preferably of extremely hard alloy steel having diametrically opposite windows 38 therein. Extending vertically of each of the windows 38 is a series of shafts 39 each carrying a series of rotors 40. The solid portions of the cleaning head intermediate the windows 38 are preferably provided with a series of digging and elevating vanes 41, the ends of which may be shaped to provide digging teeth 42.

With a cleaning head of the character described, it may be assumed that the shaft 17 is rotated in the direction indicated by the arrow 43 in Figure 7. During this rotation, the ballast will engage the rotors 40 and cause them to rotate in the direction indicated by the arrows 44, thereby constantly tending to automatically clean the spaces 45 between the rotors in such manner as to preclude the possibility of clogging these spaces by the ballast being cleaned.

Assuming the cleaning head to have been lowered during rotation thereof, to approximately the position illustrated in Figure 2, the teeth 42 and vanes 41 will tend to elevate ballast and fines and maintain the same in a state of quasi-suspension as the head rotates. While in this condition, in which the fines are effectively loosened, the suction created by the blower 30 will cause air to pass through the spaces 45 between the rotors 40 with sufficient velocity to pick up the fines and elevate them through the connection 29 and the blower to the trailer 3, wherein the fines are collected. By reference, for example, to Figure 2, it will be apparent that the vanes 41 serve to maintain the head in such predetermined spaced relation to the tie itself that the tamped zones Z beneath the ties are not disturbed in any respect.

In Figure 3 the cleaning head 27 is illustrated at the commencement of the cleaning operation, the head having been lowered during rotation thereof along the dotted line of Figure 4 in the direction indicated by the arrow-head 46. Thereafter it is caused, during continued rotation to move along the portion of the dotted line 47 into a position adjacent the rail. It is then raised by the motor 26 along the path of the line 48, traversed across the head of a rail by the traversing motor 11 and then lowered in the direction indicated by the line 49. Having reached the desired lower position it then travels in the direction indicated by the line 50 to a position adjacent the other rail, whereupon the preceding operation may be repeated.

While all of the motions described may be controlled by hand, we preferably provide a control box 51 having a series of adjustable cams not shown therein adapted to be driven by a timing or control motor 52 for timing each of the operations described and causing the cleaning head to travel through a predetermined path for successive cleaning operations. Control cams of the character referred to are well understood in the art. In Figure 17, we have illustrated in dotted lines one possible path of travel which may be followed by the cleaning head for not only cleaning the inter-tie spaces 53, but also the spaces 54 adjacent the ends of the ties to thereby permit more effective draining.

In Figure 18, there is illustrated another method of cleaning in accordance with the present invention, which comprises moving the cleaning head in one direction through a crib 55 in the opposite direction through an adjacent crib 56 and so on until the desired track area has been cleaned, after which the unit may be propelled by the motor 35 with the cleaning head so positioned as to travel along the ends of the ties in the direction of the dotted line 57 and then returned as indicated by the line 58. The exact method of cleaning may be chosen in accordance with the conditions encountered.

In Figures 8 to 11, both inclusive, we have illustrated a modified form of cleaning head comprising a series of rotors 60 providing therebetween air spaces 61 leading to a dirt elevating space 62 communicating through the hollow head 63 with the shaft 17, and also having a chamber 64 provided at its upper end with a screened inlet 65. During rotation of this head in the direction illustrated by the arrow 66, the suction of the fan blower will draw air downwardly through the chamber 64 in the direction illustrated by the arrows 67 and deliver it into the space 62 where it tends to mix with the air and dirt drawn between the rotors 60 and assist in the elevation thereof. The head may be provided at its lower end with digging teeth 68 similar to the teeth 42 before described.

In Figures 12 to 15, there is illustrated still another form of head comprising an air inlet chamber 70 similar to the chamber 64 of the figures just described, and an elevating chamber 71 having dirt and air admission openings 72. This head differs principally from the heads heretofore described, in that it is not provided with self-cleaning rotors for cleaning the openings 72. In actual practice we have found that with most materials, if such self-cleaning rotors are not provided, the openings will become clogged and further usefulness of the devices destroyed. With the rotors, however, the admission openings may be kept free from clogging.

A modified form of the invention illustrated in Figure 16 comprises a main frame 75, which is preferably assembled of channel sections and is rectangular in outline. This form of the invention is adapted to travel along a railway track at one side thereof, and support a cleaning and digging head above the track for movement thereacross. The machine as a whole is movable along the track. To this end, the main frame 75 is provided with a bearing 76 for a vertical column 77 rotatably seated therein and having a table 78 carried thereby. A boom 79 has a sleeve bearing 80 whereby it is vertically adjustable on the column 77. Vertical adjustment of the boom may be effected by a screw shaft 81 traversing a nut 82 incorporated in the sleeve bearing 80. A motor 83 and gearing 84 are provided for driving the screw shaft to raise or lower the boom. The boom, column and table are rotatable on the main frame in the bearing 76.

A carriage 85 is adapted to traverse the boom 79. The carriage 85 provides bearings for a hollow, rotating shaft 86 having a digging head 87 attached thereto. A suction hose 88 has a swivel connection 89 to the shaft 86. A motor 90 on the carriage drives the shaft through gearing 91. Through gearing 92, the motor 90 also drives a pinion 93 adapted to engage a rack 94 on the boom for shifting the carriage 85 back and forth therealong.

The machine is supported principally, when in use, on a large, flat-tread wheel 95. The wheel 95 is journaled on a suitable shaft projecting from a block 96 adjustably carried in a yoke 97. The yoke 97 is removably secured to the frame 75 as by bolting, or otherwise. A screw 98 journaled in the yoke 97 is threaded through the block 96 and carries a hand wheel 99 by which the elbow of the wheel 95 with respect to the frame 75 may be adjusted.

The main frame 75 also carries bearing brackets 100 for shafts 101. Flanged wheels 102 on the shafts 101 permit the machine to travel along a railway track after the flat-tread wheel 95 and its supporting yoke have been removed from the frame. The shafts 101 are also provided with sprockets 103 at one end, around which an endless belt 104 is trained. The belt 104 is adapted to bear on the ends of the ties of a railway track indicated at 105 and to cooperate with the wheel 95 in supporting the machine. One of the shafts 101 carries a sprocket 106 adapted to be driven by a motor through a chain connection similar to that described previously and illustrated in Figure 1. The bearing brackets 100 on the sides of the frame to which the belt 104 is applied are provided with pivoted links 107 having jaws 108 adapted to embrace the head of the track rail adjacent the machine for guiding the latter relative to the track.

It is contemplated, of course, that a motor driven blower will be mounted on the frame 75, the blower having connection with the hose 88 to suck the fines from between the ballast stones while the latter are agitated by the digging head 87. The operation of the modification of Figure 16 is similar to that of the previously described form of the invention. As before stated, the machine is adapted to travel along the rails to the point where the ballast cleaning is to be done. The frame is then removed from the track, the wheel 95 attached and adjusted so that, with the belt 104, it supports the machine in the proper position with the jaws 108 embracing the head of the adjacent rail. The boom 79 is then swung out over the track. The boom is shipped longitudinally of the machine while traveling from place to place. The boom may be swung manually or a motor drive therefor may be provided. When the boom has been swung out over the track and the carriage 85 traversed to one end of its path of movement on the boom, the latter is lowered by means of the screw shaft 81. The motor 90 is started and as the boom is lowered, the digging head penetrates the ballast layer to stir up the stones individually and agitate them so that the suction created by the motor driven blower removes the fines from the road bed. The motor 90, in addition to rotating the shaft 86 and the digging head 87, causes traversing movement of the carriage across the boom. The boom must be raised, obviously, when the head approaches either of the rails and is lowered after crossing the rails. On the approach of a train on the track, the ballast of which is being cleaned, the boom is raised and swung aside and the guide links 107 are thrown back. Ample clearance is thus provided for the passage of the train after which the boom may readily be restored to operating position. The belt 104 serves to drive the machine when the latter is in cleaning position, the guides 107 sliding along the rail when the machine is in motion. The control for the various motors necessary for driving different parts of the apparatus may be a co-ordinated control system with the usual safety devices and limit switches to prevent overtravel of any movable part and to insure the proper sequence of operations.

It will be apparent from the foregoing description and explanation that the invention provides a practical device for cleaning ballast between railway ties without necessitating the removal of the ballast from the road bed. The ballast is thoroughly stirred up and agitated by the digging head so that all the fines can be cleaned therefrom and a simple tamping operation restores the ballast to its original condition but with all the fines removed so that proper drainage is insured. In Figures 19 and 20, there is illustrated a modified embodiment of the invention, the modification consisting principally in the fact that the traversing carriage 110 which corresponds to the general carriage structure illustrated in Figure 2, carries spaced bearings 111 for two shaft housings 112. Each of these shaft housings may be of the general construction illustrated in Figure 2, and provided with a suitable cleaning head 113 at the lower end thereof. Mounted on the carriage is a carriage propelling motor 115 adapted to move the carriage and the cleaning heads bodily along a suitable cross beam 116 provided with a rack 117.

It will be apparent that operation of the carriage motor 115 will cause simultaneous movement of the two cleaning units through equal distances. The spacing of the heads is such that with one head exactly midway between the rails 118 and 119 as illustrated in Figure 19, the other head will be spaced from its adjacent rail 119 by an amount exactly equal to the spacing between the first mentioned head and either of the rails. Therefore, by the time the head intermediate the rails has cleaned the ballast up to the rail 118 in the space S between the rails, the other head will have completed its cleaning operation of the ballast through a space S' up to the rail 119. Thereupon both heads will be simultaneously raised, moved across their respective rails, and again lowered. Continued traversing movement of the carriage 110 will cause the head which was previously outside of the rail 119 to clean the space s, while the head which was previously intermediate the rails is cleaning the space s'. It will thus be apparent that the time required for cleaning a given crib is reduced by at least half without any additional labor on the part of the operator.

Each of the cleaning units is provided with a head rotating motor 120 and with a head raising and lowering motor 121. Leading from the cleaning heads are conduit sections 122 communicating with an expansion and settling chamber 123 from which a connection 124 leads to the intake of a suction blower 125. The outlet of the suction blower communicates with a conduit 126 adapted to discharge at any desired point, either adjacent the track or into a receptacle or car as before described. The expansion and settling chamber 123 likewise has a connection 127 with the conduit 126, which connection is provided with a rotating valve 128 having flukes or vanes 129 so disposed that with the valve in any position the interior of the expansion and settling chamber 123 is out of free communication with the conduit 126. In operation, the heavier particles entering the expansion and settling chamber will be subjected to such a change in velocity that they will be deposited therein and will not pass through the blower itself. Rotation of the valve 128 will discharge these heavier particles into the conduit with the fines, so that all materials removed from between ties will ultimately be delivered to a common point.

In Figure 21 there is illustrated means for accommodating the travel of the cleaning and digging head to ties which may not extend in exactly right angular relationship to the rails. This condition may be due to faulty installation of the ties, or to creeping of the rails, all as well understood in the art. In such cases, if the ties extend at a sufficient angle, provision should be made for a corresponding adjustment of the cross beam which carries the cleaning unit. As will be apparent from Figure 21, the main frame 130 is provided with a suitable pivotal mounting 131 at one end thereof for the cross beam 132 along which the cleaning unit 133 is adapted to travel. The opposite side of the frame has a link connection 134 with the cross beam, from which extends a rack 135 cooperating with a pinion 136 on the shaft of a hand wheel 137. By reason of this construction, the direction of extension of the cross beam may be changed at will, as indicated in full lines and dotted lines in this figure. In case locking means is not provided for the hand wheel, the device will be self-adjusting in such manner that the cleaning unit will find its own path of travel in accordance with the rail ties without attention on the part of the operator.

The various other constructional features of the apparatus may be in general accordance with the structures heretofore described.

The design and construction of the ballast cleaning machines herein disclosed are simple, yet the construction is of ample strength and sturdiness to withstand considerable rough handling. By the use of the invention, the cleaning of the ballast between ties can be carried out much more rapidly and at a much lower unit cost than by any method or apparatus with which we are familiar.

Although we have illustrated and described only one preferred form of our method and apparatus, it will be apparent that numerous changes in both the method and apparatus may be made without departing from the spirit of the invention as set forth in the appended claims.

We claim:

1. A railway ballast cleaning machine comprising a wheeled frame adapted to travel on the rails, a carriage movable transversely of the frame, a rotatable digging head mounted in said carriage for vertical movement, means for driving the head, and means for applying suction thereto.

2. A cleaning machine for railway ballast comprising a wheeled frame, a carriage movable thereacross, a shaft housing slidable vertically in said carriage, and a shaft rotatable in said housing having a digging head thereon, means for driving said shaft, and means for effecting a suction through said head for the removal of fines from the ballast.

3. A railway ballast cleaning machine comprising a wheeled frame, a track thereon for a carriage movable transversely of the frame, a digging head rotatably mounted in said carriage, means for driving the head, means for elevating and lowering the head, and suction means effective through said head for the removal of fines from the ballast.

4. In a ballast cleaning machine for railway tracks, the combination with a rotatable digging head, of means for supporting the head above the road bed, means for driving the head, and means for applying suction to the ballast therethrough, the head having material receiving openings therein at different heights.

5. A railway ballast cleaning machine comprising a wheeled frame adapted to travel on the rails, an auxiliary wheel attachable to said frame for supporting it adjacent the tracks, and means on the frame for moving it along the track while supported by the auxiliary wheel.

6. A digging head for a railway ballast cleaning machine comprising a substantially cylindrical member, windows therein, rollers mounted in said windows, and digging blades between said windows.

7. A digging head for railway ballast cleaning machines, comprising a hollow member having windows therein, rollers mounted in said windows, and projections for engaging the ballast and spacing the head from a tie.

8. A rotary digging head for suction ballast cleaning, comprising a hollow member, windows therein, a suction outlet in said member, and self-cleaning means mounted in said windows.

9. In a railway ballast cleaning machine, a portable carrier, a carriage movable transversely thereof, and a plurality of cleaning heads mounted in said carriage and simultaneously movable therewith.

10. A rotary digging head, comprising a hollow member having a window therein, self-cleaning means in said window, said head having a suction outlet, and means independent of the window for providing an auxiliary air supply to said head.

11. A rotary digging head for suction lifting purposes, comprising a hollow member having a window opening therethrough, self-cleaning means in said window, and means for subjecting the window to a suction flow therethrough.

12. A railway ballast cleaning machine, comprising means movable parallel to a track to be cleaned, inter-tie cleaning means carried thereby, and means for changing the path of travel of said inter-tie cleaning means in accordance with the direction of extension of the ties.

13. Mechanism for removing fine material from coarse material, comprising a head adapted to be moved in contact with the material, said head having an opening therein, draft means for causing movement of said fine material through said opening, and means movably mounted adjacent said opening and adapted to be moved upon movement of the head to prevent clogging of said opening.

14. Mechanism for removing fine material from coarse material, comprising a head adapted to be moved in contact with the material, said head having an opening therein, draft means for causing movement of said fine material through said opening, and means rotatably mounted adjacent said opening preventing clogging thereof and determining the maximum size of the fine material passing therethrough.

15. Mechanism for removing fine material from coarse material, comprising a head having an opening therein through which said fine material is adapted to pass, and a rotor in said opening preventing clogging thereof.

JAMES B. McWILLIAMS.
LAWRENCE A. MERK.